Jan. 22, 1952        N. G. KLING        2,583,379
AUTOMATIC IMMERSION APPARATUS
Filed March 16, 1949                   9 Sheets-Sheet 1
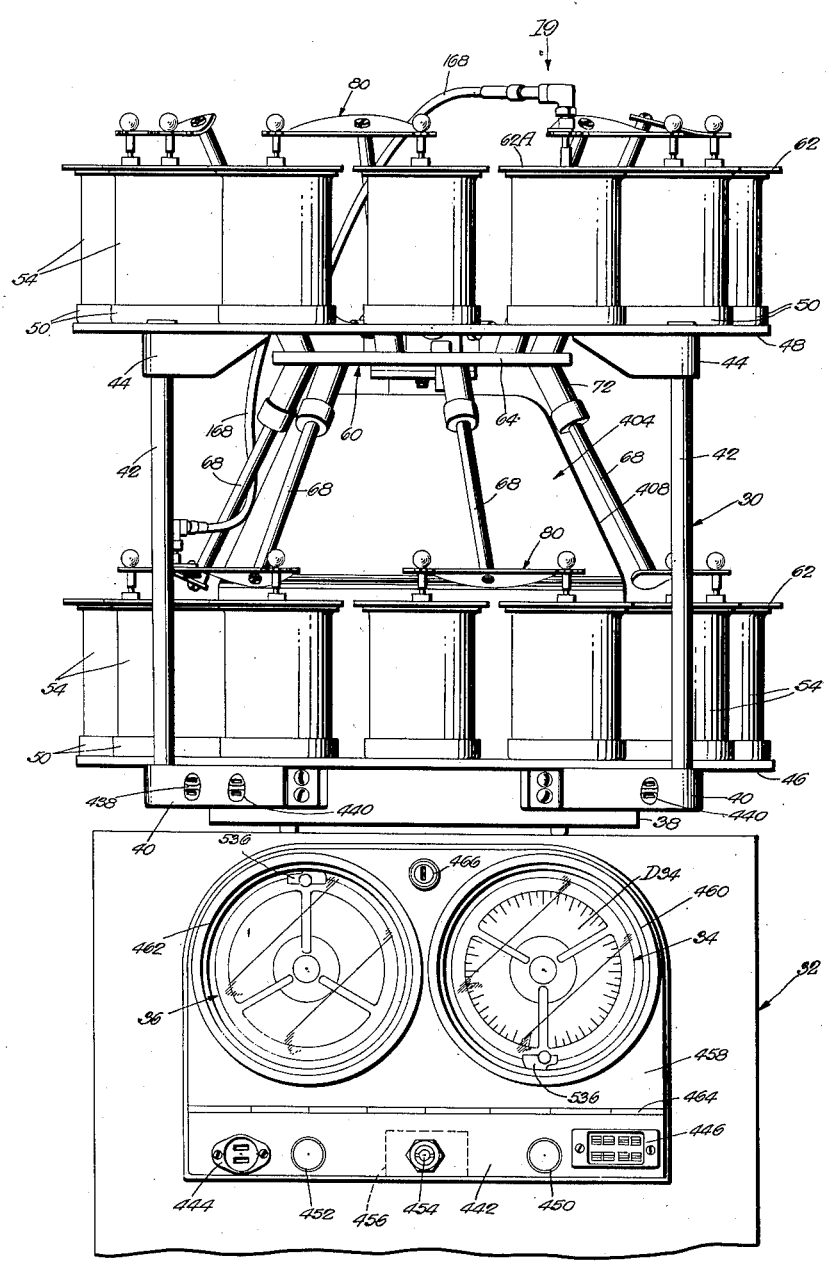
*INVENTOR.*
*NELSON G. KLING*
BY *Edwin Levisohn*
*Harry Cole*
*ATTORNEYS.*

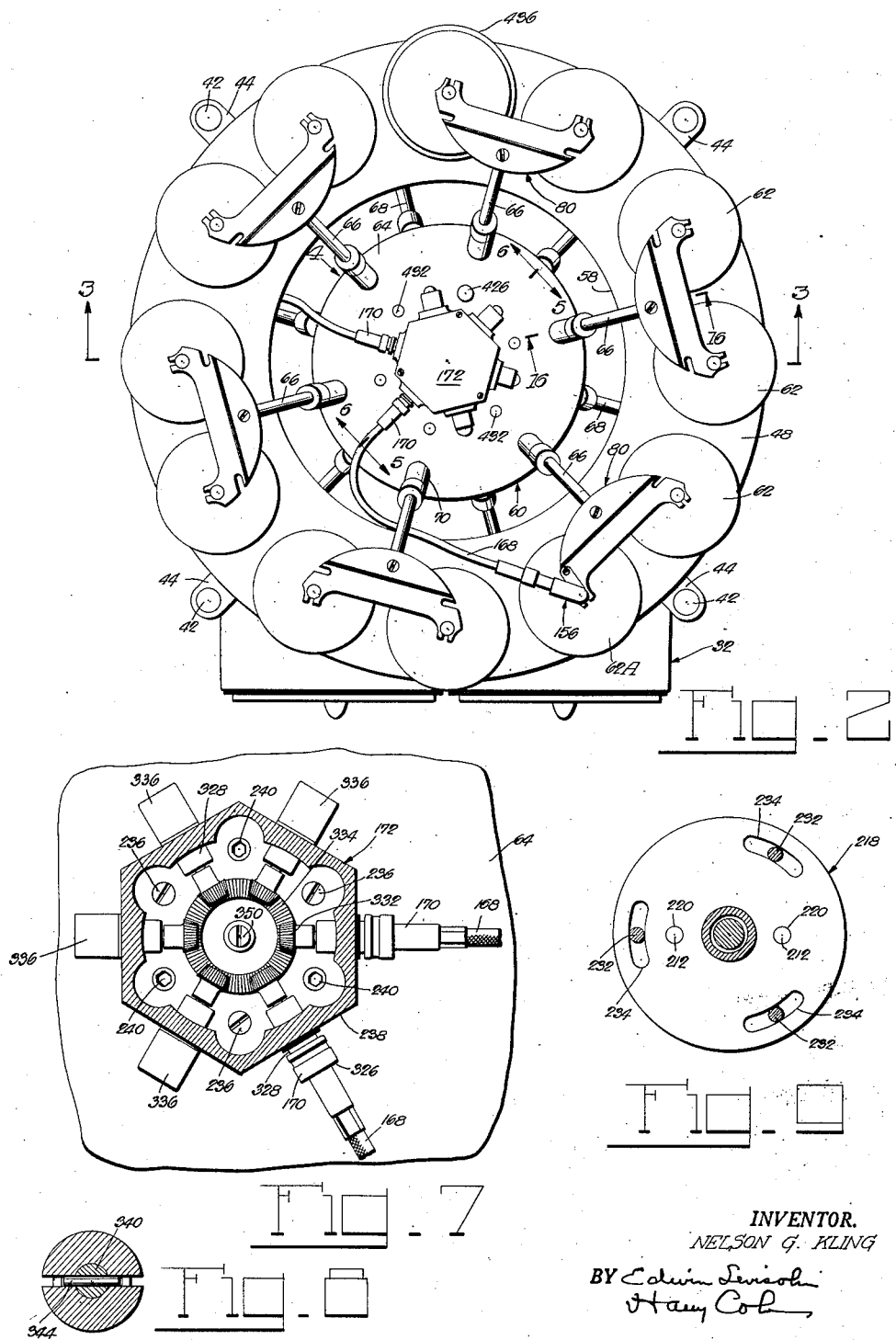

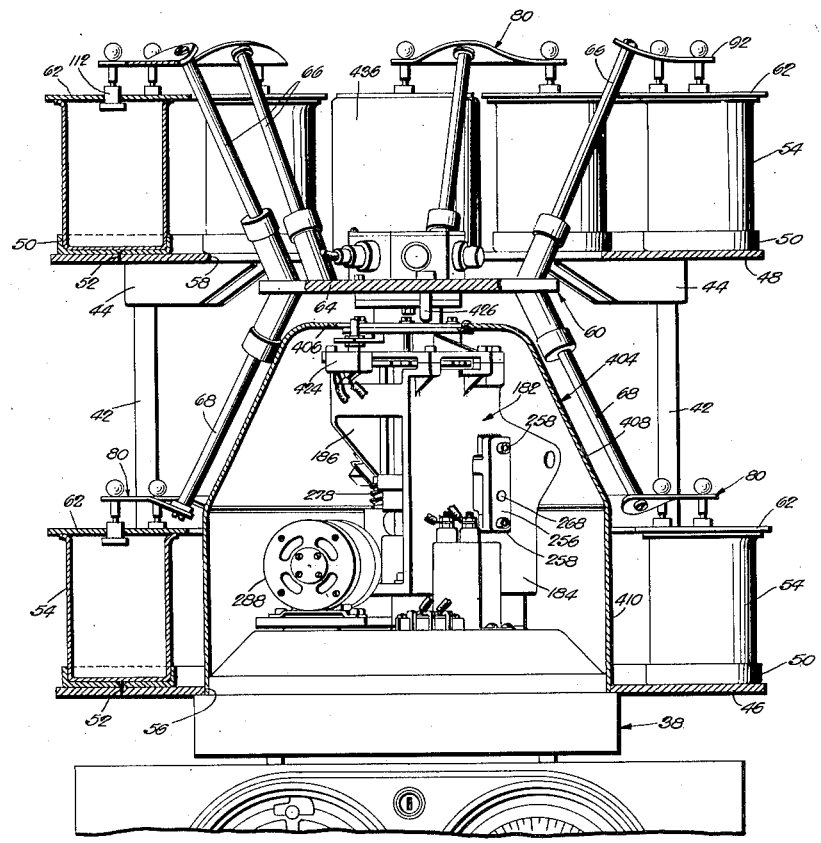

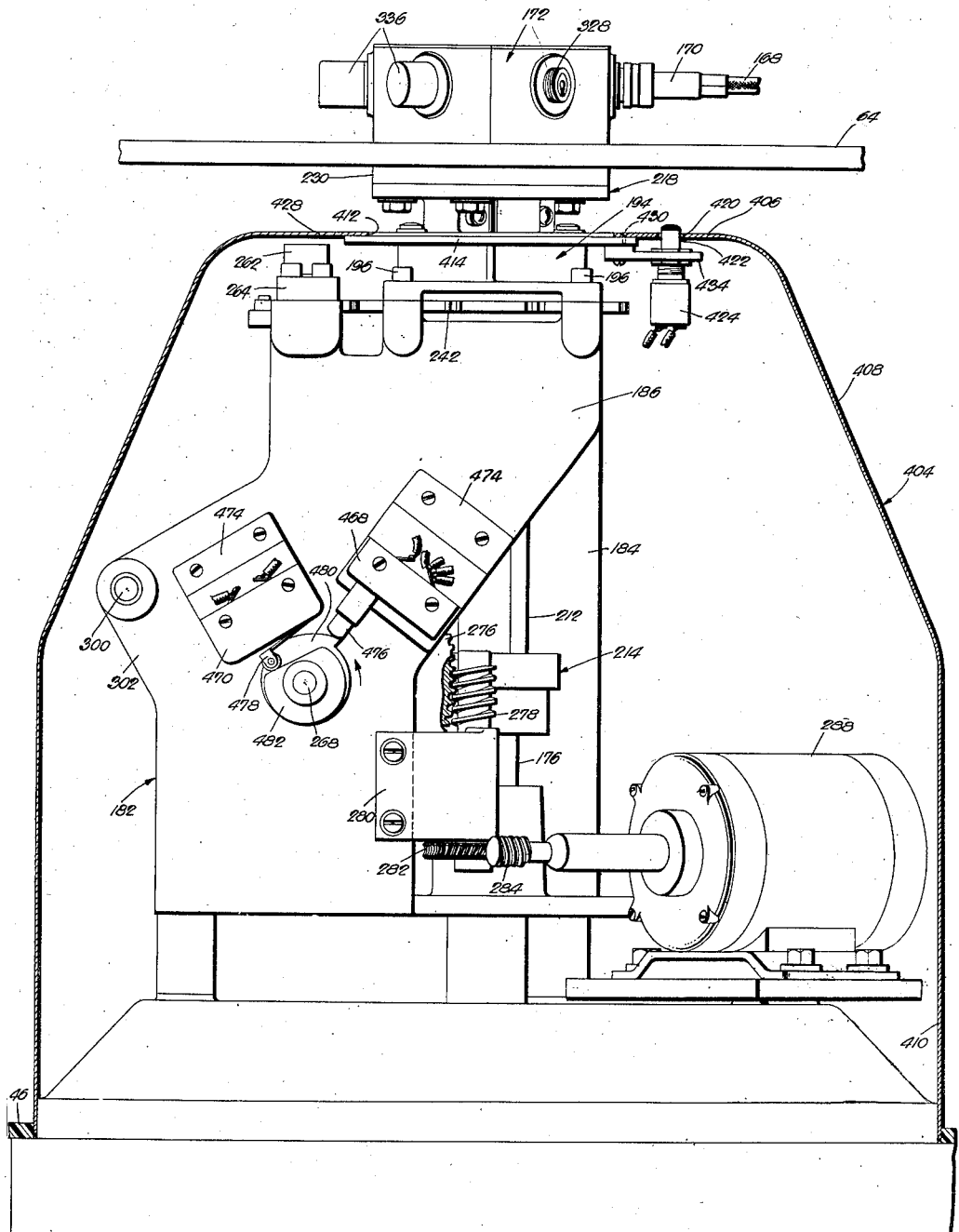

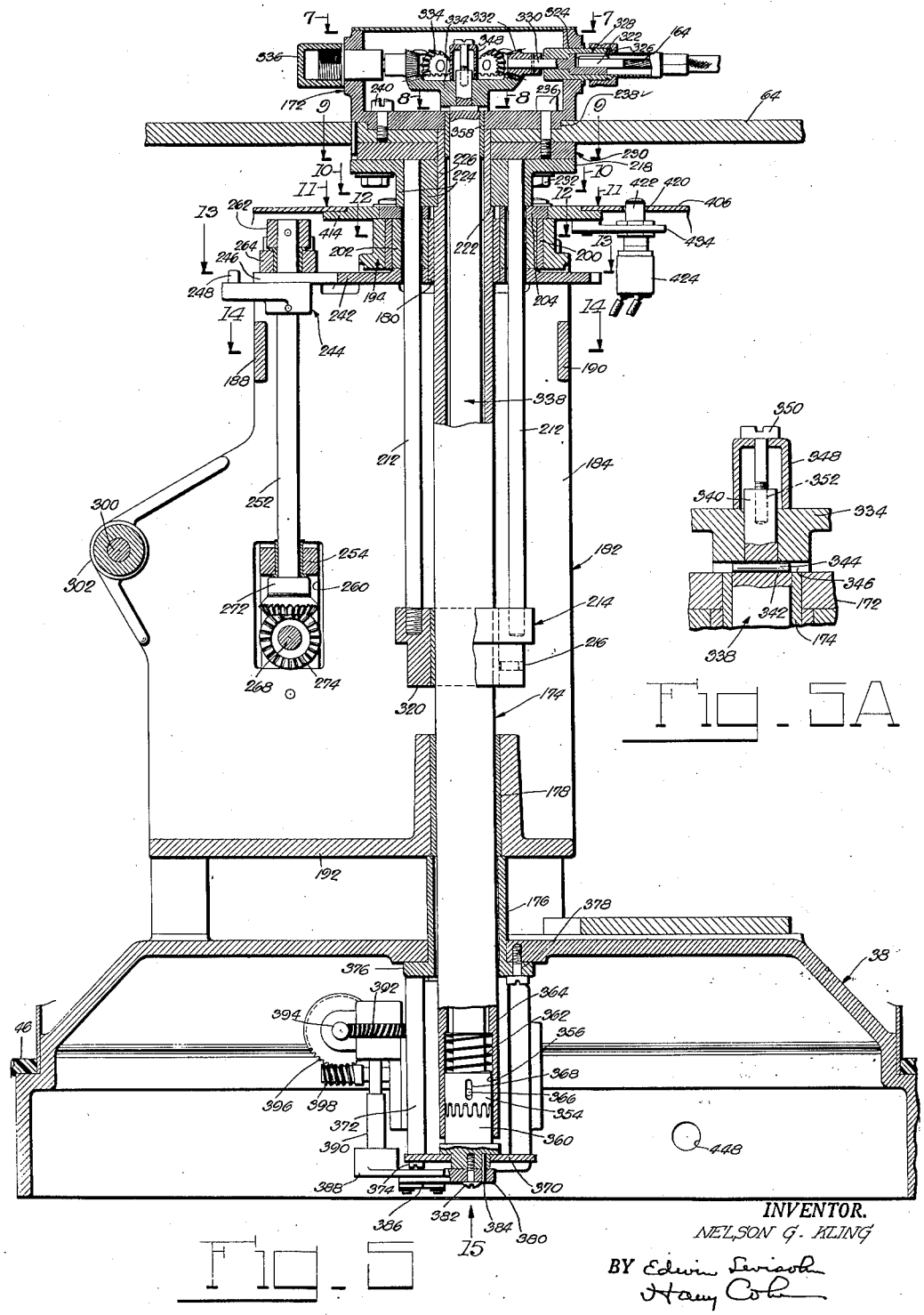

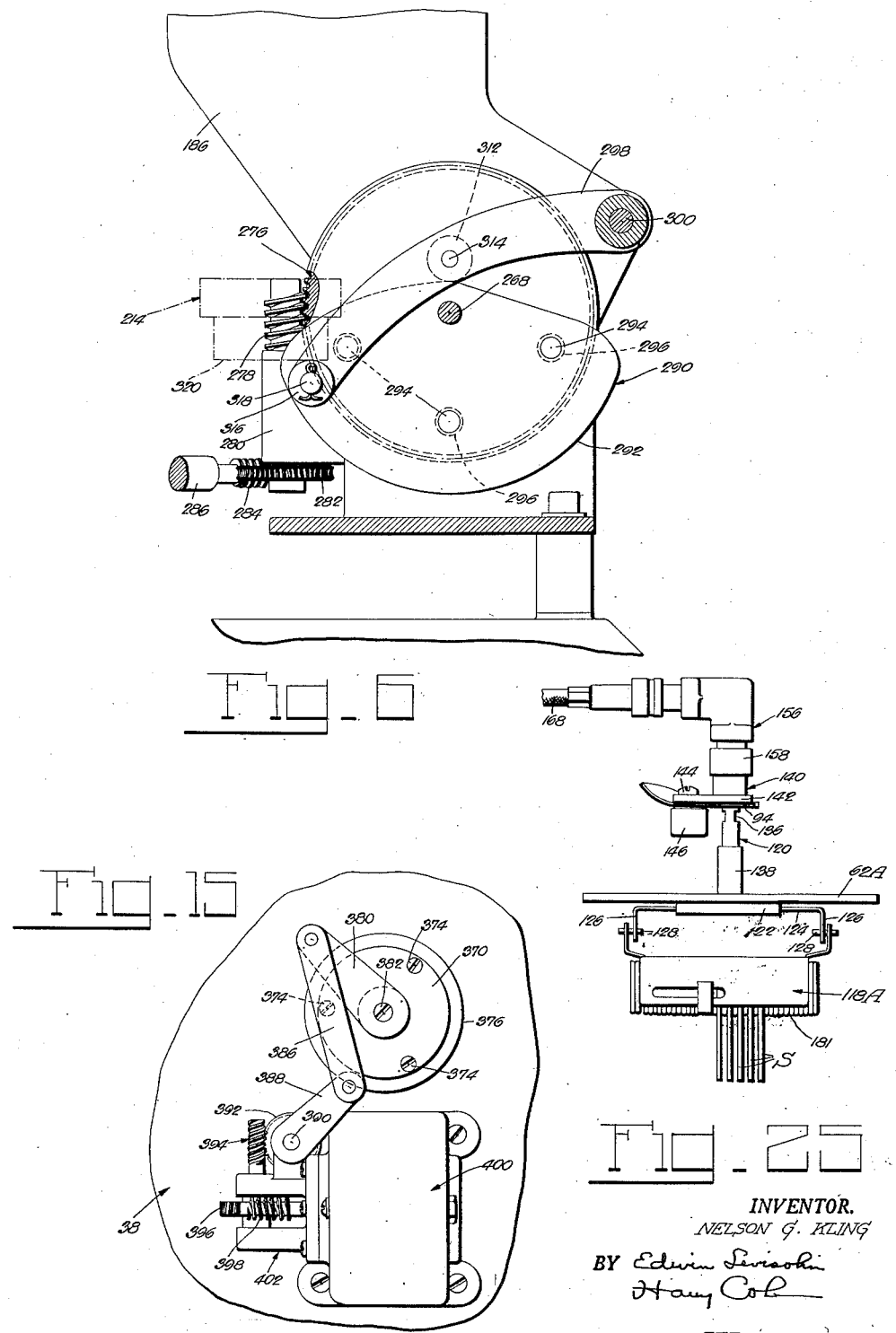

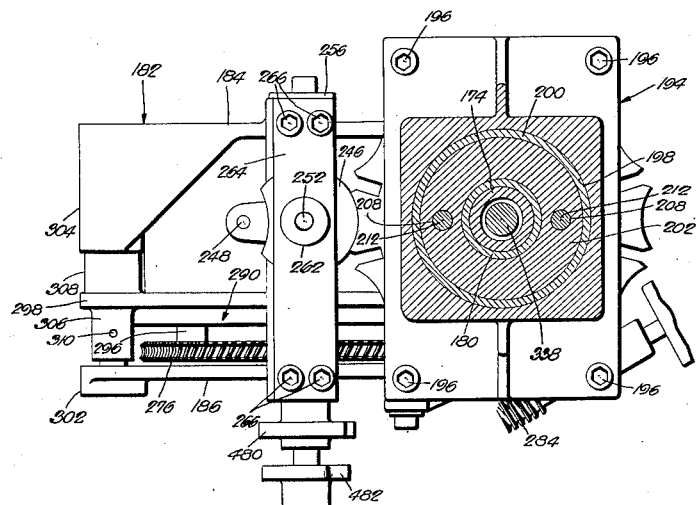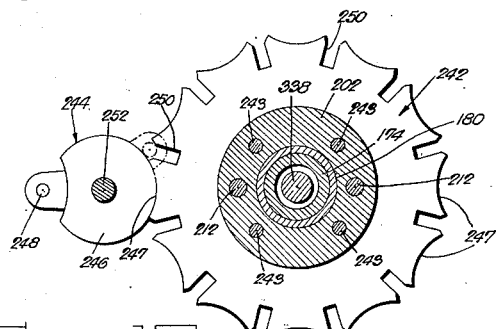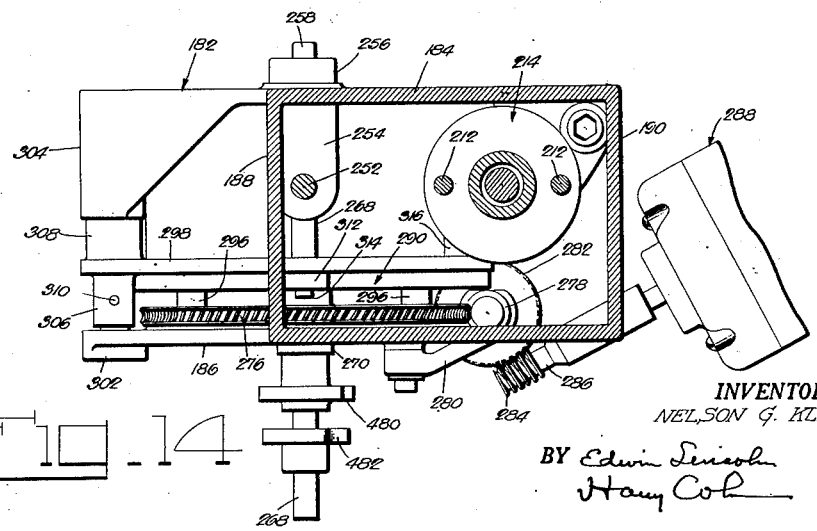

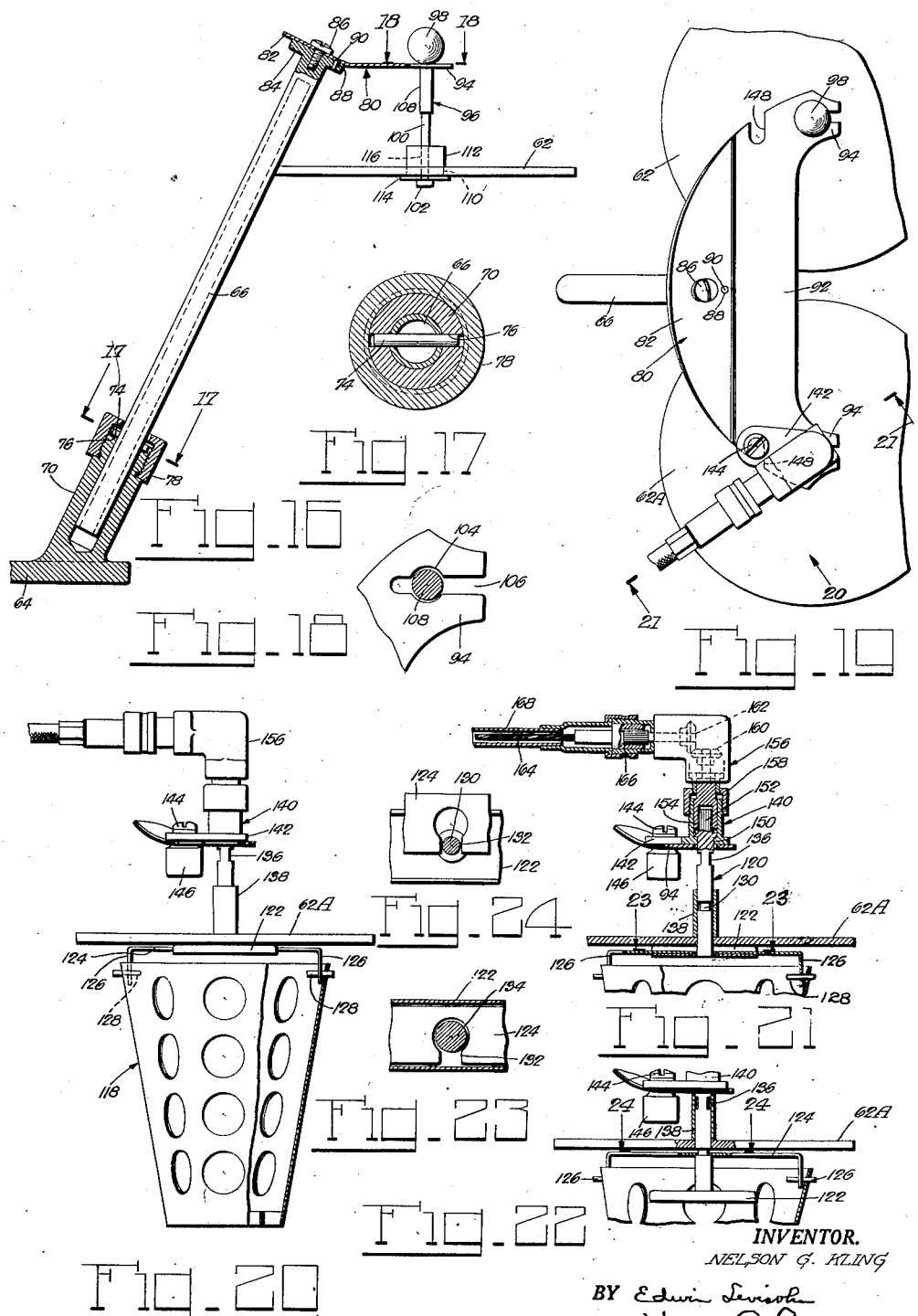

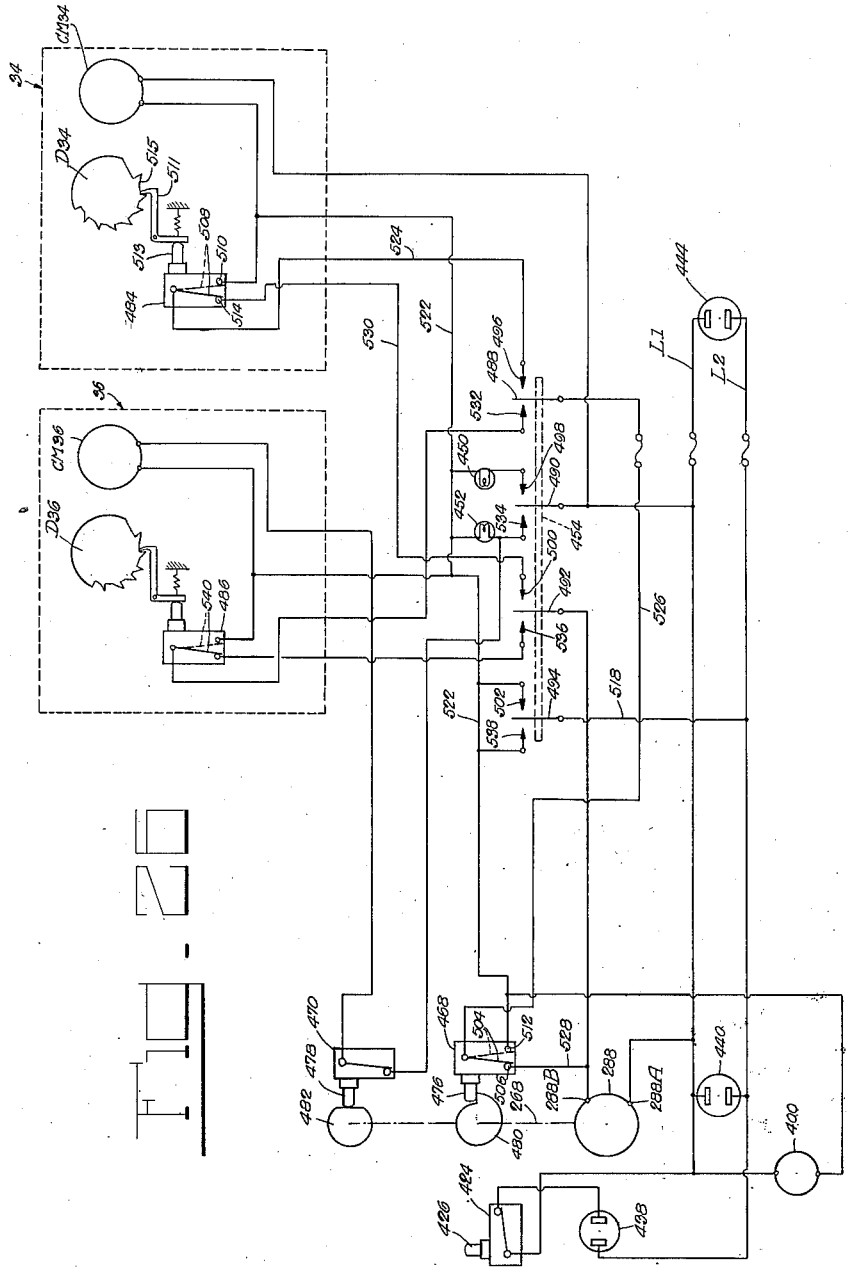

Patented Jan. 22, 1952

2,583,379

UNITED STATES PATENT OFFICE 2,583,379

AUTOMATIC IMMERSION APPARATUS

Nelson G. Kling, Roslyn, N. Y., assignor to The Technicon Company, New York, N. Y., a partnership Application March 16, 1949, Serial No. 81,651

39 Claims. (Cl. 91—46)

This invention relates to automatic immersion apparatus.

Although the apparatus embodying the present invention is useful for various purposes, it is intended primarily for use in the preparation of histological specimens for microscopic examination.

The preparation of tissue to enable the microscopic examination thereof involves a plurality of treatments of the tissue prior to the cutting of the sections from the tissue specimens for the staining of the sections which are mounted on the microscope slides. More particularly, in the preparation of the tissue it is necessary to immerse the tissue successively in a plurality of liquid agents for certain lengths of time, first to fix the tissue, then to wash the same for removing the fixative, then to dehydrate the tissue, usually by immersion of the tissue successively in a plurality of alcohols or other dehydration agents, then to immerse the tissue in a clearing agent, and thereafter to infiltrate the tissue with an infiltration agent such as, for example, paraffin, celloidin, etc. After the tissue is thus treated, it is cut into sections of the desired thickness; then the paraffin or other infiltration medium is removed from said sections, usually by a solvent for the paraffin, after which the sections are mounted on the slides and stained.

In U. S. Patent No. 2,341,198 and other patents granted to Edwin C. Weiskopf automatic immersion apparatus or machines for use in preparing histological tissue specimens are disclosed.

One of the objects of the present invention is generally to provide an automatic immersion apparatus which is especially well adapted for use either in the preparation of the tissue for the staining of the sections or for use in treating the sections on the slides for staining them.

The operating time of the apparatus when used for preparing the tissue for staining is considerably greater than the operating time of the apparatus when used for staining the sections on the slides. It is therefore another object of this invention to provide apparatus having control devices which are especially well adapted and conveniently operated, selectively, to place the apparatus under the control of different timing devices, respectively.

Another object of the invention is to provide an automatic immersion apparatus wherein either the dehydration treatment or the staining treatment may be performed without removing the various liquid-containing receptacles used in the different treatments respectively from the apparatus.

A further object of the invention is to provide an automatic immersion apparatus of greatly increased capacity with little or no increase in the floor space required for the apparatus.

A further object of the invention is to provide improved means for rotating the tissue or the sections mounted on their slides in the various liquids during the treatment of the tissue.

A yet further object of the invention is generally to provide an automatic immersion apparatus or machine of improved construction and operation, while retaining the basic advantageous features of the machine shown by the patents referred to above.

The above and other objects, features and advantages of the present invention will be fully understod from the following description considered in connection with the accompanying drawings which illustrate the presently preferred embodiment of the invention.

In the drawings:

Fig. 1 is a front view in elevation of the apparatus embodying the present invention;

Fig. 2 is a top plan view of the apparatus;

Fig. 3 is a sectional view, partly in elevation, on the line 3—3 of Fig. 2;

Fig. 4 is a view in elevation, on a larger scale, of part of the apparatus as viewed in the direction of the arrow 4 in Fig. 2;

Fig. 5 is a vertical sectional view on the line 5—5 of Fig. 2;

Fig. 5A is a view on a larger scale of certain parts shown at the upper portion of Fig. 5;

Fig. 6 is a vertical view of part of the apparatus, partly in section, taken on the line 6—6 of Fig. 2;

Fig. 7 is a sectional view on the line 7—7 of Fig. 5;

Fig. 8 is a detailed sectional view, on a larger scale, on the line 8—8 of Fig. 5;

Fig. 9 is a sectional view on the line 9—9 of Fig. 5;

Fig. 10 is a sectional view on the line 10—10 of Fig. 5;

Fig. 11 is a sectional view on the line 11—11 of Fig. 5;

Fig. 12 is a sectional view on the line 12—12 of Fig. 5;

Fig. 13 is a sectional view on the line 13—13 of Fig. 5;

Fig. 14 is a sectional view on the line 14—14 of Fig. 5;

Fig. 15 is a bottom plan view of part of the apparatus as viewed from the arrow 15 in Fig. 5;

Fig. 16 is a sectional view on a larger scale, on the line 16—16 of Fig. 2;

Fig. 17 is an enlarged sectional view on the line 17—17 of Fig. 16;

Fig. 18 is an enlarged sectional view on the line 18—18 of Fig. 16;

Fig. 19 is a plan view, on an enlarged scale, of part of the apparatus as viewed in the direction of the arrow 19 of Fig. 1;

Fig. 20 is a view partly in elevation and partly in section as viewed in the direction of the arrow 20 in Fig. 19;

Fig. 21 is a sectional view on the line 21—21 of Fig. 19;

Fig. 22 is a view illustrating in conjunction with Figs. 23 and 24 the manner of releasably attaching parts of the apparatus to each other;

Figs. 23 and 24 are sectional views, on a larger scale, on the lines 23—23 and 24—24 of Figs. 21 and 22, respectively;

Fig. 25 is a view similar to Fig. 20 showing a different material holder, namely one used for staining slides;

Fig. 26 is a circuit diagram.

Referring now to the drawings in detail the automatic immersion apparatus or machine embodying the present invention comprises a frame 30 mounted on a support 32 which, as here shown, is preferably in the form of a cabinet in which the electrically operated timing devices 34 and 36 are mounted. Said timing devices and other parts contained in or mounted on cabinet 32 will be subsequently referred to in greater detail. Frame 30 includes a base 38, a plurality of circumferentially spaced hollow bracket arms 40, a plurality of vertical rods 42 secured at their lower ends in the outer ends of arms 40, respectively, and a plurality of bracket arms 44 secured to the upper ends of vertical rods 42. Lower and upper receptacle supports 46 and 48, respectively, are mounted on bracket arms 40 and 44, being fastened thereto in any suitable way as by screws (not shown). A plurality of receptacle holders 50, each in the form of a shallow pan, are carried by supports 46 and 48, being secured thereto in any suitable way as by screws 52. The receptacle holders 50 are arranged in uniform circumferentially spaced relation for similarly positioning the removable receptacles or beakers 54, as will be readily understood. It will be noted that, as is clearly shown in Figs. 2 and 3, supports 46 and 48 surround various mechanisms and are therefore provided with central circular openings 56 and 58 respectively.

A conveyor 60 is mounted for vertical and rotary movements for moving the tissue, microscope slides, or other material into and out of the various receptacles 54 at predetermined intervals and for simultaneously moving the receptacle covers 62. Said conveyor 60 includes a carrier plate 64 provided with a series of circumferentially spaced upwardly extending arms here shown as rods 66 and a plurality of circumferentially spaced downwardly extending rods 68, rods 66 being inclined upwardly and outwardly and rods 68 being inclined downwardly and outwardly. All of said rods are rigidly but preferably removably secured to carrier plate 64. For this purpose, the upper rods or arms 66 are each secured to an upwardly and outwardly inclined tubular part 70 rigidly fastened to the upper surface of said carrier plate, and the lower rods or arms 68 are similarly secured in a downwardly and outwardly extending tubular part 72 fastened to the lower surface of said carrier plate. The securement is the same for all the rods 66 and 68 and is illustrated by Figs. 16 and 17 with reference to one of the rods 66. As here shown the rod fits slidably within the companion tubular part 70 and has a cross pin 74 which engages the upper end of the companion tubular part 70 in grooves 76. A cap 78 is threaded on the upper end of part 70 and holds pin 74 in said grooves, thus securing rod 66 to tubular part 70 and preventing said rod from turning in relation to said tubular part or socket 70. A bracket 80 is fastened to the outer end of each of the rods or arms 66 and 68 in the manner illustrated by Figs. 16 and 19. More particularly each bracket 80 has a part 82 which is fastened to the upper enlarged end 84 of the companion supporting rod or arm by a screw 86, a dowel pin 88 on rod part 84 fitting in an opening 90 in part 82 for accurately determining the position of bracket 80 in relation to the companion rod, as will be readily understood. Each bracket 80 has a part 92 which is angularly related to bracket part 82 so as to be positioned horizontally notwithstanding the angular positions of rods 66 and 68. It will be noted that brackets 80 are constructed so as to be adapted interchangeably for either arms 66 or arms 68. Each bracket 80 carries two receptacle covers 62, or one such cover and a receptacle cover 62A of a somewhat different construction as will subsequently more clearly appear. Bracket part 92 is provided with slotted end portions 94 to receive a cover-supporting pin 96. The latter has an enlarged head or knob 98, a lower part 100 of reduced diameter and an enlarged end portion 102. As shown in Fig. 18, the slot of portion 94 has an enlarged part 104 spaced inwardly from entrance opening 106 of the slot. The upper part 108 of pin 96 is of larger diameter than the width of the slot except at the enlarged portion 104 of the latter, so that said pin cannot be inserted or removed from said slot unless the pin is raised to position the narrower part 100 thereof in the slot. The cover 62 has a central opening 110 in which a sleeve 112 has a sliding fit, the lower end of said sleeve having a flange 114 on which the cover rests. Said sleeve has a central opening 116 in which the narrower part 100 of pin 96 is movable. Accordingly it will be understood that, when conveyor 60 descends, covers 62 engage the upper edges of the companion receptacles 54 but are not forced against the receptacles since sleeves 112 are downwardly movable in relation to said covers. In order to facilitate the assembly of covers 62 with their companion pins 96 and with the supporting sleeves 112, the central opening 110 in the covers 62 is large enough to permit the passage of the head 98 of the pin therethrough.

Each bracket 80 has provision for supporting a holder 118 (Fig. 20) for the tissue or other material which is subjected to the action of the liquids in the various receptacles 54 during the operation of the machine. In such case a cover 62A which is somewhat different from covers 62 is associated with the bracket, as illustrated by Figs. 19 to 24. The pin 120 which supports the cover 62A has fixed thereto at its lower end a channel-shaped member 122 in which a supporting member 124 for holder 118 is supported. Said member 124 has ear portions 126 provided with pin projections 128 releasably engageable in apertures at the upper end of the holder 118 for releasably securing said holder to said supporting member. Holder 118 is flexible so that it may be pressed into oval form at its top in order to attach it to and remove it from pin projections 126. Said holder is perforated so that when it is inserted in a receptacle 54 the liquid therein freely enters said holder for treating tissue or other material placed therein. Pin 120 has a reduced portion 130 which enables the supporting member 124 to be assembled with member 122 in the manner shown by Fig. 24. More particularly it will be observed that member 124 has a slot with a narrow entrance part 132 to clear the smaller part 130 of the pin but which is too narrow to clear the larger part 134 of said pin (Fig. 23). Also, pin 120 has a narrow part 136 to enable the pin to be moved into and out of the entrance opening 106 of the slot of the bracket part 94. A sleeve 138 is slidable on pin 120 and must be moved upwardly on pin 120 clear of the narrow part 130 thereof in order to enable supporting member 126 to be assembled with and disassembled from the companion supporting member 122.

As hereinafter stated and as explained in the patents to Weiskopf, No. 2,341,197 and No. 2,341,198, it is desirable to turn the holder 118 when the latter is immersed in the liquid in the various receptacles 54. This is accomplished, pursuant to the invention, by providing mechanism for rotating pin 120 which thereby rotates member 122 and holder-supporting member 124 when said two members are interfitted as above described and as shown by Fig. 23. When so interfitted, rotation of member 122 causes rotation of the holder member 126. A fitting 140 is provided for attaching pin 120 to bracket 80 in such manner as to hold said pin in position axially of the holder 118 and yet to enable the required vertical and rotary movement of said pin. The fitting 140 includes an arm 142, a screw 144 and a companion clamping nut 146 for releasably securing said fitting to the bracket. In this connection it will be observed that at each end of the bracket part 90 there is an open-end slot 148 to receive the shank of screw 144. It will be understood that when clamping nut 146 is tightened against the adjacent surface of bracket part 92 around slot 148, fitting 142 is tightly but releasably secured to said bracket. The upper end of pin 120 has a sliding fit in an opening 150 in the lower end of fitting 140. Said pin has a gear portion 152 which meshes with and is rotated by an internal gear 154. The latter is part of a transmission fitting or coupling 156 which includes the coupling nut 158 threaded on fitting 140. Bevel gears 160 and 162 are mounted in coupling fitting 156 and are operated by the flexible drive shaft 164 operatively connected to gear 162 by the transmission gear coupling 166. The flexible shaft 164 is contained within a flexible cover tube 168 and has its opposite ends connected by a fitting 170 (Fig. 2) to a gear case 172 hereafter more particularly described.

When the apparatus is used for staining slides, the holder 118A (Fig. 25) is mounted on the supporting pin 120, in association with a cover 62A, instead of the holder 118. Thus, it will be noted that the holder 118A has provision for supporting a plurality of micro-slides S depending from the holder so that the tissue sections mounted on said slides may be subjected to the action of the various staining and other liquids used in performing the staining operation. It will be observed that the slides S are held in laterally spaced relation so that the tissue may be completely immersed in the various liquids in the receptacles 54. The holder 118A does not, per se, constitute part of the present invention, such holder being described and claimed in the application of Edwin C. Weiskopf Ser. No. 769,897, filed August 21, 1947, now U. S. Patent No. 2,522,416. It may be noted, however, that said holder includes a helical spring 181 which removably holds slides S between adjacent convolutions of the spring. As described above with reference to Figs. 20 to 24, the sleeve 138 is positioned around pin 120 between support bracket 80 and cover 62A. The main purpose of this sleeve is to limit the extent to which pin 120 may move downwardly when cover 62A is seated on the top of the companion receptacles 54, thus limiting the downward movement of the slide holder 118A in said receptacle when pin 120 is disconnected from bracket 80 and coupling 156. In this connection it will be understood that cover 62A being seated on the top of receptacle 54 the upper end of said sleeve engages the lower surface of arm 142 and the latter cannot move downwardly. Accordingly, should a technician or other individual wish to remove, from the support 46 or 48, a receptacle 54 in which the slide holder 118A is positioned, he can do so by disconnecting nut 158 from member 140 and by unclamping nut 146 and in such case said slide holder would not move downwardly into the receptacle.

It will be understood that when the apparatus is used for staining slides all of the receptacles 54 of each set of receptacles on the companion support 46 or 48 are provided with the liquids required in the staining operation, and that when the apparatus is used for performing the dehydration process all of the receptacles 54 of the set of receptacles on either of said supports contain liquids required for carrying out the dehydration process. As rods 42 are removably secured in bracket arms 40 said rods and upper support 48 can be removed from the machine or if the machine is bought without said rods and support they can be easily added to the machine when desired. It will be noted that rods 66 are removed from conveyor plate 64 when the upper support 48 is omitted or removed. It will be noted however that two sets of liquid-containing receptacles are available on the upper and lower supports respectively, both when the apparatus is used for dehydration or for staining, thus increasing the capacity of the apparatus for either operation. Moreover it will be noted that the set of receptacles on either of said supports may be used for the staining operation, when said receptacles contain the liquids required for that purpose, while the other set of receptacles may contain liquids for use only in the dehydrating operation, and vice versa, so that it is unnecessary to disturb one set of receptacles when it is desired to use another set of the receptacles on its companion support 46 or 48, as the case may be. For example, it happens not infrequently, that the apparatus having been made ready for a dehydration operation, for which purpose a set of receptacles containing the necessary liquids is disposed on either of the supports 46 or 48, it is found necessary or desirable to operate the machine or apparatus for staining slides. In such events it is not necessary to remove the set of receptacles placed on the companion support 46 or 48 in preparing the machine for operation for dehydration, but on the contrary such set of receptacles may be left in position on said support, and another set of receptacles may be arranged, on the other support 46 or 48, as the case may be so that the machine may be operated for staining slides. When the machine is used for the dehydration operation, which takes place under the control of the timing device 34, the slide holder 118A is detached or no slides are placed therein, and similarly when the machine is operated for staining, under the control of the timing device 36, the holder 118 is removed.

The mechanisms for raising and lowering the conveyor 60 and for turning the latter to move the tissue or other material holder 118 into and out of the receptacles 54, in succession, with intervening rest periods of said holder in the respective receptacle will now be described.

As more clearly shown in Fig. 5 the conveyor part or plate 64 is mounted at the top of a tubular member or hollow shaft 174, which is mounted for vertical and rotary movement in lower guide bearings 176 and 178 and in an upper guide bearing 180. Guide bearing 176 is secured on the base 38 of the main frame 30, while bearing 178 is provided in the frame 182 mounted on and secured to the top of base 38. Frame 182 has laterally spaced side walls 184 and 186, the upper cross members 188 and 190 and the lower part 192 all in integral relation with each other and with certain other frame parts which will hereinafter be described. A horizontally disposed mounting 194, which is internally cylindrical, is releasably secured to the upper ends of frame plates 184 and 186 by machine bolts 196 (Figs. 4, 5 and 12). Said member 194 has a circular opening 198 (Fig. 12) through which and in which the tubular shaft or sleeve 174 and members associated therewith are movable. A cylindrical bearing 200 is fixed to mounting member 194 in said opening 198 thereof. A cylindrical member 202 is journaled for rotation in bearing 200 and is provided with the above-mentioned bearing sleeve 180 in which the hollow shaft or tubular member 174 is journaled for rotation and for longitudinal movement. A plate 204 (Figs. 5 and 11) is fastened to cylindrical member 202 at the top thereof by screws 206, the holes for said screws in plate 204 being countersunk so that the heads of said screws are flush with the upper surface of said plate. The latter being thus secured to cylindrical member 202 rotates with the latter and is supported, as shown in Fig. 5 by mounting member 194, thus in turn supporting cylindrical member 202.

Openings 208 are provided in cylindrical member 202, being diametrically disposed therein as shown in Fig. 12, and similar openings 210 are provided in plate 204 in registry with openings 208 for the passage therethrough of the rods 212 (Fig. 5). The lower ends of said rods 212 are fixed to a collar 214 which is secured to shaft 174 in any suitable way as by one or more screws 216 so that said rods move with said shaft longitudinally and rotatably. The upper end portions of rods 212 are connected to flanged coupling member 218 which is provided with openings 220 (Fig. 9) in which the upper end portions of said rods are received as shown in Fig. 5. The upper end of shaft 174 has an annular shoulder 222 on which the central narrower portion 224 of member 218 is seated. As shown in Fig. 10, said part 224 of member 218 is clamped and thereby connected to the reduced upper end portion 226 of shaft 174 by means of the screw operated clamping sleeves 228 which engage shaft portion 226 through internal openings in the part 224 of member 218. A coupling member or plate 230 is seated on member 218 and is secured thereto by bolts 232 which pass through arcuate openings 234 in member 218 and are threaded into said plate 230. It will be understood that the arcuate openings 234 provide for the adjustment of plate 230 circumferentially of shaft 174. The purpose of this adjustment will be subsequently described. The conveyor plate 64 is fastened to plate 230 by means of machine bolts 236 which pass through the bottom of gear casing 172 and through holes in conveyor plate 64 and are threaded into the top plate 230. The gear casing 172 fits in a recess 238 in the upper surface of conveyor plate 64. Screws or bolts 240 fasten said gear casing to the conveyor plate 64 in position in said recess 238.

It will be noted that shaft 174, collar 214, rods 212, plates 218 and 230 and conveyor plate 64 constitute a movable unit, and that said unit is vertically and rotatably movable. More particularly, it will be understood that during one operating cycle of the machine conveyor plate 64 is moved vertically upwardly for withdrawing the tissue or other material holder 118 from the receptacle in which it had previously been positioned, after which said plate is turned so as to align said holder axially with the succeeding receptacle, following which the conveyor carrier 64 is lowered so as to position said holder in said next receptacle where it remains for a predetermined length of time after which the next operating cycle of the machine takes place. The mechanism for thus moving the unit which as before stated includes conveyor plate 64 comprises an intermittent mechanical movement, here shown as preferably constituted by a Geneva gear movement. Said Geneva gear includes a driven Geneva gear member 242 which is fastened to the cylindrical member 202 in any suitable way as by machine bolts 243 (Fig. 13). It will be noted that as shown in Fig. 5 Geneva gear member 242 is provided with openings for rods 212. The driving Geneva gear member 244 including its dwell part 246 and its actuating pin member 248 which engages the driven gear member 242 successively in the circumferentially spaced radial slots 250 of the latter, is mounted on and rotatable by a vertical shaft 252. Shaft 252 is journaled for rotation in a bearing member 254 carried by a bracket member 256 (Fig. 3) secured to the outer surface of side 184 of frame 182 by bolts 258. It will be noted that bearing part 254 is integral with said bracket and extension through an opening 260 in frame side 184. The upper end of shaft 252 is secured to a vertical thrust bearing member 262 supported by the cross bar 264. The latter is secured as shown in Figs. 4 and 12 to the upper ends of frame sides 184 and 186 by bolts or screws 266. Dwell part 246 of the Geneva gear may be positioned for close engagement with the companion concavely curved portions 247, respectively, of the driven Geneva gear 242 so that the latter cannot turn unless positively moved by the driving pin 248 when the shaft 252 is turned. The shanks of screws 266 and 258 have a small clearance in the holes of brackets 264 and 256, respectively, so that said brackets may be moved (when said screws are loosened) in order to place gear part 246 closely against the curved portion 247 of gear 242 after which said screws are tightened to clamp said brackets in their adjusted positions.

Vertical shaft 252 is driven by a horizontal shaft 268 which is journaled for rotation in a bearing 270 in frame side 186 and in a bearing carried by bracket 256. Shaft 252 is geared to driving shaft 268 by the beveled gears 272 and 274. Shaft 268 is actuated by a worm gear 276 which is fixed thereto and is driven by a companion worm gear 278 carried by a shaft which is journaled in a bearing 280 fastened to frame side 186. The lower end of said shaft has a worm gear 282 fixed thereto and driven by a companion worm gear 284 operated by the shaft 286 of an electric motor 288. The latter is secured in position on the top of base 38 of the main frame. As subsequently explained, motor 288 is operated intermittently under the control of the timing devices 34 and 36. It will be understood that during one revolution of shaft 268 conveyor plate 64 is turned through an angular distance required to move the holder 118 from a position over one receptacle 54 to a position over the adjacent receptacle. However before this angular movement of carrier 64 can take place it is necessary to move the unit which includes the conveyor plate 64 upwardly to withdraw the holder 118 from the receptacle 54 in which it is positioned. The mechanism for moving said unit upwardly to withdraw the holder 118 from the receptacle, so that it can be moved to the next receptacle, and for moving the unit downwardly so as to position the holder within said last mentioned receptacle includes shaft 268 which also operates shaft 252 of the Geneva gear movement. Accordingly, said shaft 268 may be referred to as the main shaft of the machine.

The vertical movement of the conveyor unit is accomplished by means of a rotary cam 290 which is fixed to and is rotated by gear 276. As here shown, said cam is of the plate type having a peripheral cam edge 292 of the outline shown in Fig. 6. Said cam is secured to gear wheel 276 by screws 294 passing through spacing collars 296 and threaded into the side of said gear wheel. A cam-follower arm 298 is fixed to a pivot pin or shaft 300 which is pivotally mounted for turning movement in bearings 302 and 304 of frame 182. Spacing collars 306 and 308 disposed at the opposite sides respectively of arm 298 holds said arm in correct position in relation to the edge of the cam. Collar 306 is preferably welded or otherwise fixed to arm 298 and a pin 310 passes through said collar and through shaft 302 for fixing said cam follower arm to said shaft. A cam-follower roller 312 is revolvably mounted on a pin 314 fixed to arm 298 intermediate the ends thereof. Said cam-follower roller 312 rides on the peripheral edge of cam 290, as will be readily understood (Fig. 14). A roller 316 is revolvably mounted on a pin 318 fixed to arm 298 at the outer end thereof, said roller engaging the lower edge 320 of member 214 which is fixed to shaft 174 as explained above. It will be understood that the weight of shaft 174 and the parts carried thereby hold the cam-follower collar 312 in engagement with the peripheral edge of cam 290 at all times.

In the operation of the mechanism for actuating the conveyor 60, shaft 268 makes one revolution under the control of either the timing device 34 or the timing device 36, as will be subsequently further explained. During this revolution of shaft 268 cam 290 is turned for raising the conveyor 60 to withdraw the material holder or holders from the receptacles in which they had previously been positioned. During this upward movement of the conveyor the latter is held against rotation or turning movement by the dwell part 246 of the Geneva gear mechanism, and the design of the edge of the cam 290 is such that the conveyor is held in its raised position until the Geneva gear mechanism operated by vertical shaft 252 has operated to turn the conveyor through the angular distance required to position the material holder or holders over and in alignment with the upper ends of the receptacles into which said holders are thereby lowered respectively, whereupon the cam, continuing to rotate, gradually allows the conveyor to move downwardly for placing the holders in their receptacles respectively. The Geneva gear mechanism is so designed in regard to the dwell part 246 and driving part 248 in relation to the driven Geneva gear 242 that the latter is not driven until a short time after the conveyor 60 is in its upper or retracted position, so that said conveyor has a temporary dwell period in its raised position, thus allowing any liquid carried by the holder and the material in the holder to drain into the receptacle from which the holder has just been retracted, thus avoiding dripping of such liquid on the machine.

When the holder is in its companion receptacle 54 it is rotated for improving the action of the liquid on the material, as explained in the above-mentioned Patents No. 2,341,197 and No. 2,341,198. Pursuant to the present invention the holder is preferably rotated alternately in opposite directions instead of continuously in one direction. More particularly, in the present machine the holder is turned through one revolution alternately in opposite directions. As explained above, with particular reference to Fig. 21, pin 120 is rotated by the mechanism which includes the flexible shaft 164 which is connected to the gear box 172 by the coupling 170. As shown in Fig. 5 the inner end of flexible shaft 164 is provided with a driving pin 322 which releasably engages a driving member 324, being releasably held in said engagement by the threaded cap 326 threaded on the outer end of the nipple 328 which is fixed in the peripheral wall of the gear casing. Said nipple 328 provides a bearing for the shaft 330 which carries member 324 and a companion bevel gear 332. The latter is driven by a bevel gear 334 as clearly shown in Figs. 5 and 7. As illustrated, the gear casing has a plurality of outlets at which the nipples 328 and the companion bevel gears are located so that a plurality of flexible shafts may be connected to the gear casing for turning a plurality of holders both in the upper tier of receptacles, on the upper support 48, and in the lower tier of receptacles on the lower support 46. Further, it will be understood that the multi-outlet gear box enables a drive shaft to be connected thereto at the most convenient point with reference to the location of the material holder to be rotated thereby. The outlets which are not in use are removably closed by caps 336.

Gear 334 which is operable to turn one or more of the flexible shafts is connected to the upper end of a vertically disposed rotary shaft 338 which is disposed within the hollow shaft 174. As shown in Figs. 5A and 8, shaft 338 has a reduced upper end portion 340 providing a shoulder 342 at which a cross pin 244 passing through said reduced part of the shaft is disposed. The lower end of gear 334 seats on shoulder 342 and has a groove 346 in which cross pin 344 is engaged, whereby to couple said gear to shaft 338. The gear is secured releasably in coupled relation to said shaft by a cap 348 and a screw 350 which is threaded into a tapped hole 352 in the top of the reduced end portion of said shaft. As shown in Fig. 5 shaft 338 has a lower part 354 which has a slidable and rotary fit in the lower internally enlarged portion 356 of shaft 174 which therefore provides a bearing for one end of shaft 338. The bearing for the upper end of said shaft is provided in the bottom of the gear case as indicated at 358. Part 354 also constitutes a clutch member and for this purpose is provided with clutch teeth which releasably engage companion clutch teeth on a companion clutch member 360, which is rotatable in the bearing surface 356 of shaft 174. It will be understood that when shaft 174 is raised clutch member 354 disengages the companion clutch member 360 so that even though the latter continues to rotate, as will be later explained, shaft 338 is not rotated during the upward and downward movements of the conveyor 60 and while the conveyor is in its raised position. When the shaft 174 is lowered clutch member 354 automatically engages the companion clutch member 360, and to aid in accomplishing this result a compression spring 362 is disposed within the lower end of shaft 174 between one end of clutch member 354 and an internal annular shoulder 364 on shaft 174. It will be noted that clutch member 354 is slidable on the lower part of shaft 338 and is held against rotation relative to said shaft by a cross pin 366 which engages clutch member 354 in a slot 368. Clutch 360 is carried by and is journaled for rotation in a bearing plate 370 carried by a plurality of posts 372, being fastened to the lower shouldered ends of said posts by screws 374 as shown in Figs. 5 and 15. The upper ends of posts 372 are fixed to a ring 376 which is fastened by means of screws 378 to the inner top surface of frame base 38. It will be noted that as here shown ring 376 is formed as a part of the bearing member 176 of shaft 174.

A lever arm 380 is secured to the lower end of clutch member 360 by a screw 382 and a dowel pin 384. Said lever 380 is connected by means of a link 386 to a rotary arm 388, the opposite ends of said link being pivotally connected to the outer ends of lever 380 and arm 388 respectively. Arm 388 is rotated continuously in the same direction, but the linkage constituted by said arm and by link 386 and lever 380 results in the turning of lever 380 alternately in opposite directions through one revolution in each direction. Arm 388 is fixed to and rotated by a shaft 390 driven by a worm gear 392 which in turn is driven by a companion worm gear 394. The latter is on a shaft which is driven by a worm gear 396 actuated by a companion gear 398. The latter is fixed to the shaft of an electric motor 400 which is preferably a synchronous motor. The gears are all carried by supporting bracket 402 secured to the motor stator or frame which is fixed to base 38. It will be understood that the gear ratios of the various gears just described are such that shaft 338 is rotated at the desired speed, ordinarily about 5 R. P. M., i. e., 5 oscillations per minute, since as explained shaft 338 is rotated alternately in opposite directions with one revolution in each direction. As indicated above, motor 400 may run continuously during the operation of the apparatus, whether the latter operates for one day or for one hour under the control of the timing devices 34 and 36 respectively, and in this connection it will be understood that this is a practicable arrangement because the periods of time required for transferring the material from one receptacle to another is relatively short. It will be understood however that it is within the scope of the present invention to provide switching means for interrupting operation of motor 400 during the operation of the conveyor for transferring the holders from one set of receptacles to the next set of receptacles.

A housing cover 404 is provided for the mechanisms which are mounted on base 38 below the top receptacle support 48. Said cover is formed in one piece and has an upper horizontal part 406, a conical part 408 and a cylindrical part 410. It will be noted that the conical part 408 makes room for the downwardly and outwardly directed rods 68. The upper part 406 of said cover has a central opening 412 for the passage of the unit which includes the shaft 174 and the rods 212. Said upper part of the cover is supported by a ring 414 which is fastened adjustably to the top of the upper frame member 194 by screws 416 which pass through companion arcuate slots 418 in said ring and are threaded into tapped holes in the upper edge of said frame member 194 (Fig. 11). This fastening arrangement provides for adjustment of cover 404 circumferentially of frame member 194 so that an opening 420 in the top part 406 of said cover (Fig. 4) in which the push pin 422 of a switch 424 may be aligned in vertical registry with a releasably engageable switch-operating pin 426 (Fig. 3) carried by conveyor plate 64. The cover is fastened to the outer marginal edge portion 428 of ring 414 in any suitable way as by a plurality of screws 430. The conveyor plate 64 has a plurality of circumferentially spaced threaded holes 432 so that the location of switch-operating pin 426 may be changed as desired. And it will be understood that ring 414 which carries a bracket 434 for supporting switch 424 may be placed in any position to correspond to the location of switch-operating pin 426. Said switch 424 is provided for operating a solenoid actuated valve (not shown) for admitting water into a tissue washer receptacle 436 which as here shown is mounted on the upper support 48, it being understood that another tissue washer receptacle may be mounted on the lower support 46. The tissue washer receptacle is preferably of the siphon-operated type, such as that shown in Fig. 7 of Patent No. 2,341,197, and water flows continuously into said receptacle so long as the valve, operated by the solenoid which is controlled by the switch 424, is open. It will be understood that when the material holder is lowered into the washer receptacle switch 424 is closed by switch-operating pin 426 for admitting the water into the washing receptacle. As indicated on the circuit diagram (Fig. 26) the terminals of switch 424 are connected to an electric receptacle or outlet 438 which may be mounted in one of the bracket arms 40 as indicated in Fig. 1. As said bracket arms are hollow, the wiring may be housed within said arms, and it will be noted that additional outlets 440 may be provided on one or more of the bracket arms 40. A paraffin bath (not shown) may be mounted on either or both supports 46 and 48 in the position of one or more receptacles 54. A paraffin bath such as that here referred to is shown in Patent No. 2,157,875.

Referring to Fig. 1, the cabinet 32 has a front panel part 442 on which are mounted an electric receptacle or socket 444 for connecting the apparatus to an electric supply or power source, and a multi-terminal socket 446 to receive a companion multi-terminal removable plug (not shown) at the end of a cable which may extend into the hollow base 38 through an opening 448 (Fig. 5), the wires of said cable being connected to various terminals (not shown) mounted within base 38. The wiring will be subsequently described with reference to the circuit diagram shown in Fig. 26. The panel part 442 of cabinet 32 also has mounted thereon pilot lights 450 and 452 for the timing devices 34 and 36 respectively. Also, the operating handle 454 of a double-throw switch 456 which is positioned within cabinet 32 is mounted on panel 442, said handle being shown in the neutral position of the switch. The electrical parts of the apparatus are disconnected from the supply lines which are plugged into the socket 444 unless switch 454 is closed. When the handle 454 is moved to the right (viewing Fig. 1) the switch 456 is connected in the circuit and the apparatus is placed under the control of timing device 34, and when the switch handle 454 is moved to the left the apparatus is connected in the electric circuit and placed under the control of timing device 36. The switch-operating handle 454 is indicated schematically in the wiring diagram (Fig. 26). It will be noted that one of the outlets 440 is shown in Fig. 26 as connected to the supply socket 444, and it will be understood that a plurality of such outlets may be provided on the different bracket arms 40 of the base as explained above. This provides a convenient arrangement for connecting the paraffin bath heater to the circuit and also for connecting the valve-operating solenoid of the washer or washers 436. The cabinet has a cover 458 provided with windows 460 and 462 to permit observation of the timing devices 34 and 36 respectively. Said cover is hinged at its bottom as indicated at 464 and it may be provided with a lock as indicated at 466 in order to prevent unauthorized access to the timing device.

The control system for the apparatus includes the micro-switches 468 and 470 (Fig. 4) mounted on brackets 472 and 474 respectively which are attached to frame side 186 externally thereof. Said switches have the usual movable operating members 476 and 478 respectively. Cams 480 and 482 for operating said switches are fixed to and are rotated by shaft 268. Micro-switches 484 and 486 (Fig. 26) are mounted on the timing devices 34 and 36 respectively and are operable by said timing device as explained in the above-mentioned Patent No. 2,324,122.

When it is desired to operate the apparatus under the control of the timing device 34, as when the apparatus is used for dehydrating tissue, switch handle 454 is moved to the right so that the movable contact members 488, 490, 492 and 494 of switch 456 engage the companion stationary terminals 496, 498, 500 and 502 respectively of said switch. This causes the electric clock motor CM34 of timing device 34 to operate, and pilot light 450 is illuminated indicating that the apparatus is operating under the control of said timing device 34. As stated above motor 400 operates continuously when the electric supply plug is connected to the receptacle 444. Assuming that the material holder 18 containing the tissue or other material which is to be subjected to the action of the liquids in the various receptacles 54 is in one of the receptacles which, as illustrated in Fig. 2, is the receptacle closed by the cover 62A, said holder is rotated in said receptacle, conveyor 60 being in its "down" or lower position. After the timing device 34 has operated for a certain length of time as predetermined by the location of notches in the timing disk D34 micro-switch 484 is actuated and a circuit is completed to motor 288 so that the latter turns shaft 268 which operates through the above described mechanism including cam 290 and the Geneva gear mechanism 242, 244, first to raise the conveyor 60 to its upper position for withdrawing the holder 18 from the receptacle, then to turn said conveyor to a position in which the holder 18 is centered over the next receptacle, and then to lower said conveyor to insert said holder into said last mentioned receptacle. This operating cycle is completed during one revolution of shaft 268, and at the end of said revolution of said shaft motor 288 is de-energized and stops operating. This cycle of operation is repeated at appropriate intervals according to the adjustment of the timing device 34 accomplished by the notched timing disk and associated mechanism as described in said Patent No. 2,157,875, together with micro-switches 468 and 484 or micro-switches 468 and 486. It will be noted that the supply circuit to motor 288 is controlled jointly by the micro-switches 484 and 468, the latter being operated by cam 480. Thus, when switch 456 is closed for operating the apparatus under the control of timing device 34, switch handle 454 having been moved to the right, the circuit to the motor 288 may be traced as follows: One side of the line L1 is connected directly to one terminal 288A of the motor 288. The other side of the line L2 is connected to the other terminal 288B of the motor through switches 464 and 468, the movable contact member 504 of switch 468 being in contact with the stationary contact member 506 and the movable contact member 508 of switch 484 being engaged with the stationary contact member 510 as soon as the micro-switch operating lever 511 enters a notch in the timing disk releasing micro-switch pin 513 so that contact members engage contact 510. Said switches 468 and 484 also include the stationary contact members 512 and 514 respectively. The dotted line position of the movable contact member 508 shown in Fig. 26 represents the closed position of switch 484 for operating motor 288 when contact member 504 of switch 468 is in engagement with contact 506. Said switch 484 being thus closed, the connection of terminal 288B of motor 288 to line L2 may be traced from wire 518 to main switch terminal 502, to wire 520 and wire 522 to switch terminal 510 of switch 484, to movable contact member 508 of said switch, wire 524 to switch contacts 496, 488, wire 526 to the movable contact member 504 of switch 468 and the stationary contact 506 to wire 528 which is connected to said terminal 288B of motor 288. Switch 468 remains in the circuit-closing position illustrated in Fig. 26 so long as lever 511 is stationary in the notch of the disk but at the end of one revolution of shaft 268 cam 480 having moved to the position shown in Fig. 4 actuates switch-operating element 476 to move the movable contact member out of engagement with contact 506 and into engagement with the contact 512. It will be noted that contact member 508 of switch 484 is at this time still in engagement with contact 510 whereby the circuit to motor 288 is interrupted and the motor stops. At the end of the cycle, i. e., when motor 288 has stopped running, the material holder 118 or 118A as the case may be is in its down or fully projected position in the companion receptacle 54. The clock motor CM34 turning disk D34 moves edge 515 of the notch, into which the lever 511 has entered, against said lever and turns the latter so as to operate pin 513 of switch 484 to move contact member 508 into engagement with contact 514. This completes the circuit through motor 288 temporarily, i. e., just long enough to turn shaft 268 the short distance required to displace the high point of cam 480 (Fig. 4) out of engagement with the pin 476 of switch 468 whereby contact member 504 moves to the full line position in engagement with contact 506, as shown in Fig. 26, thus interrupting the circuit to motor 288. It will be noted that the short angular movement of shaft 268 required to release cam 480 from microswitch pin 476 does not result in upward movement of conveyor shaft 174. When contact 504 of switch 468 is in engagement with contact 512, the movable contact 508 of switch 484 being in engagement with contact 514 as just explained so that the connection of motor terminal 288A of the motor to line L2 is from wire 518, contacts 494, 502, wire 520, contacts 512, 504 (switch 468), wire 526, contacts 488, 496, wire 524, contacts 508, 514 (switch 584), wire 530, contacts 492, 500, and wire 532. When cam 480 releases pin 476 of the micro-switch 468, movable contact 504 disengages contact 512 and thus interrupts the connection of line L2 to the motor and the latter stops running as previously stated. At this time contact 504 engages contact 506 and is ready to complete the circuit to the motor as soon as contact 508 of switch 484 again engages contact 510 which occurs when the next notch of disk D34 is positioned to receive the switch control lever of the timing device.

At the end of a predetermined rotary movement of disk D34, not more than one revolution, the lever 511 which operates switch 484 is retracted, by a cam member 536 which moves with said disk, and is held in retracted position as shown in Patent No. 2,157,875, so that said lever cannot enter a notch in said disk. Thus, the operation of the apparatus is terminated, according to the setting of said cam member of clock motor CM34, even though the latter continues to operate.

When the apparatus is operated under the control of the timing device 36, as when the apparatus is used for staining slides, the switch 456 is actuated by handle 454 to engage movable switch contacts 488, 490, 492 and 494 with stationary switch contacts 532, 534, 536 and 538 respectively, so that the circuit of motor 288 is controlled by micro-switch 468 and micro-switch 486, substantially in the same way as the control of said motor by micro-switches 468 and 484. However it is desirable that the timing device 36 be interrupted during the period of operation of motor 288 so that the periods of immersion of the slides in the various liquids may be accurately controlled, it being noted in this connection that the entire period of operation of the timing device 36 may be as short as one hour, and the corresponding periods of immersion of the slides in the various liquids in the several receptacles into which the slides are carried by slide holder 118A are of comparatively short duration. In other words, if the timing device 36 were permitted to run during the operation of the conveyor 60 each period of immersion would be appreciably decreased below that required according to the staining process. The interruption of a timing device such as 36 is referred to in Patent No. 2,324,122. This periodic interruption of the running of the timing device is accomplished in the present apparatus by the cam 482 in conjunction with the micro-switch 470 and it will be observed that said cam 482 is designed to open switch 470 which controls the circuit of the electric clock motor CM36 of timing device 36 immediately after switch 486 is operated by disk D36 first to engage the movable contact member 540 with the stationary contact member 542 and then with contact 544 as explained above with reference to timing device 34. The stationary contact member 544 has the same function with respect to the control of motor 288 as the stationary contact member 514 of switch 484 of timing device 34 as explained above. The final interruption of the operation of the apparatus is accomplished as explained above with reference to timing device 36.

It will be understood that while I have disclosed the presently preferred embodiment of my invention various changes may be made without departing from the underlying idea or principles of the invention within the scope of the appended claims.

Having thus described my invention, what I claim and desire to secure by Letters Patent, is:

1. Automatic immersion apparatus, comprising upper and lower horizontal supports each provided with means to support a plurality of receptacles laterally of each other, a conveyor mounted both for vertical movement and for movement in a horizontal plane in relation to said supports, supporting means on said conveyor to carry a material-holder into and out of the receptacles on said upper support, supporting means on said conveyor to carry a material-holder into and out of the receptacles on said lower support, and mechanism operatively connected to said conveyor for moving the latter vertically and in said horizontal plane in relation to said upper and lower supports.

2. Automatic immersion apparatus, comprising upper and lower horizontal supports each provided with means to support a plurality of receptacles laterally of each other in a circular row, said upper support having a central opening, a conveyor having an operating shaft disposed axially of said opening and mounted for vertical and turning movements in relation to said supports, supporting means on said conveyor extending above said upper support to carry a material-holder into and out of the receptacles on said upper support, supporting means on said conveyor extending through said central opening of the upper support to carry a material-holder into and out of the receptacles on said lower support, and mechanism operatively connected to said shaft for imparting said vertical and turning movements thereto.

3. Automatic immersion apparatus, comprising upper and lower horizontal supports each provided with means to support a plurality of receptacles laterally of each other in a circular row, said upper support having a central opening, a conveyor having an operating shaft disposed axially of said opening and mounted for vertical and turning movements in relation to said supports, supporting means on said conveyor for carrying a plurality of covers, one for each receptacle on said upper support, and to carry a material-holder into and out of the receptacles on said upper support, supporting means on said conveyor extending through said opening of the upper support for carrying a plurality of covers, one for each receptacle on said lower support, and to carry a material-holder into and out of the receptacles on said lower support, and mechanism operatively connected to said shaft for imparting said vertical and turning movements thereto.

4. Automatic immersion apparatus, comprising upper and lower horizontal supports each provided with means to support a plurality of receptacles laterally of each other in a circular row, said upper support having a central opening, a conveyor having an operating shaft disposed axially of said opening and mounted for vertical and turning movements in relation to said supports, said conveyor having a central part and upwardly and downwardly extending arms carried by said central part for carrying a plurality of covers for the receptacles on said upper and lower supports, respectively, and to carry material-holders into and out of the receptacles on said supports, respectively, said arms being inclined to the axis of said shaft, and mechanism operatively connected to said shaft for imparting said vertical and turning movements thereto.

5. Automatic immersion apparatus, comprising upper and lower horizontal supports each provided with means to support a plurality of receptacles laterally of each other, a conveyor mounted both for vertical movement and for movement in a horizontal plane in relation to said supports, supporting means on said conveyor to carry a material-holder into and out of the receptacles on said upper support, supporting means on said conveyor to carry a material-holder into and out of the receptacles on said lower support, mechanism operatively connected to said conveyor for moving the latter vertically and in said horizontal plane in relation to said upper and lower supports, a motor operatively connected to said mechanism for the operation thereof, a plurality of timing devices of different time cycles, respectively, in circuit with said motor for controlling the operation of said motor, and selectively operable switching means in said circuit for placing said motor under the control of a selected one of said timing devices.

6. Automatic immersion apparatus, comprising upper and lower horizontal supports each provided with means to support a plurality of receptacles laterally of each other, a conveyor mounted both for vertical movement and for movement in a horizontal plane in relation to said supports, supporting means on said conveyor to carry a material-holder into and out of the receptacles on said upper support, supporting means on said conveyor to carry a material-holder into and out of the receptacles on said lower support, mechanism operatively connected to said conveyor for moving the latter vertically and in said horizontal plane in relation to said upper and lower supports, a motor operatively connected to said mechanism for the operation thereof, a plurality of timing devices of different time cycles, respectively, in circuit with said motor for controlling the operation of said motor, each of said timing devices having its own operating motor, and selectively operable switching means in said circuit for placing said first mentioned motor under the control of a selected one of said timing devices and for concomitantly connecting the motor of said one of the timing devices to a source of power.

7. Automatic immersion apparatus, comprising upper and lower horizontal supports each provided with means to support a plurality of receptacles laterally of each other, in a circular row, a conveyor mounted for vertical movement in relation to said supports and for horizontal turning movement about an axis extending in the direction of said vertical movement, supporting means on said conveyor to carry a material-holder into and out of the receptacles on said upper support, supporting means on said conveyor to carry a material-holder into and out of the receptacles on said lower support, mechanism for operating said conveyor to raise, turn and lower the latter in sequence, and mechanism carried by said conveyor for turning the material-holding means when said conveyor is lowered.

8. Automatic immersion apparatus, comprising upper and lower horizontal supports each provided with means to support a plurality of receptacles laterally of each other, in a circular row, a conveyor mounted for vertical movement in relation to said supports and for horizontal turning movement about an axis extending in the direction of said vertical movement, supporting means on said conveyor to carry a material-holder into and out of the receptacles on said upper support, supporting means on said conveyor to carry a material-holder into and out of the receptacles on said lower support, mechanism for operating said conveyor to raise, turn and lower the latter in sequence, mechanism carried by said conveyor for turning the material-holding means when said conveyor is lowered, and means including a clutch for operatively connecting said last mentioned mechanism to a source of power, the driven part of said clutch being movable with said conveyor and automatically disengaging the driving part of said clutch when said conveyor is raised and automatically engaging the driving part of said clutch when said conveyor is lowered.

9. Automatic immersion apparatus, comprising upper and lower horizontal supports each provided with means to support a plurality of receptacles laterally of each other, in a circular row, a conveyor mounted for vertical movement in relation to said supports and for horizontal turning movement about an axis extending in the direction of said vertical movement, supporting means on said conveyor to carry a material-holder into and out of the receptacles on said upper support, supporting means on said conveyor to carry a material-holder into and out of the receptacles on said lower support, mechanism for operating said conveyor to raise, turn and lower the latter in sequence, and mechanism carried by said conveyor for turning the material-holding means when said conveyor is lowered, said conveyor having a hollow shaft vertically and rotatably movable therewith, said mechanism for turning the material-holder comprising a shaft disposed within said hollow shaft and vertically movable therewith, said inner shaft being in operative engagement with said material-holding means, and rotated means releasably engageable with said inner shaft, when said conveyor is lowered, for rotating said inner shaft.

10. Automatic immersion apparatus, comprising upper and lower horizontal supports each provided with means to support a plurality of receptacles laterally of each other, in a circular row, a conveyor mounted for vertical movement in relation to said supports and for horizontal turning movement about an axis extending in the direction of said vertical movement, supporting means on said conveyor to carry a material-holder into and out of the receptacles on said upper support, supporting means on said conveyor to carry a material-holder into and out of the receptacles on said lower support, mechanism for operating said conveyor to raise, turn and lower the latter in sequence, and mechanism carried by said conveyor for turning the material-holding means when said conveyor is lowered, said conveyor having a hollow shaft vertically and rotatably movable therewith, said mechanism for turning the material holder comprising, gears mounted on the upper end of said conveyor and in operative engagement with said material-holding means, a shaft mounted in said hollow shaft and vertically movable therewith, said inner shaft being in operative engagement with said gears for actuating the latter, and rotated means releasably engageable with said inner shaft, when said conveyor is lowered, for rotating said inner shaft.

11. Automatic immersion apparatus, comprising a horizontal receptacle-support, a conveyor mounted for vertical movement to and from lower and upper positions for positioning a material-holder in and withdrawing it from the receptacle on said support, said conveyor having a vertical hollow shaft movable therewith, means for raising and lowering said hollow shaft for correspondingly moving the conveyor, and mechanism carried by said conveyor for rotating the material holder including a rotary shaft disposed in said hollow shaft and movable therewith, gears mounted on said conveyor externally thereof and operatively connected to said rotary shaft and to said material-holder, and rotated means positioned to be engaged by said rotary shaft, when said hollow shaft is lowered, for rotating said rotary shaft.

12. Automatic immersion apparatus, comprising a horizontal receptacle-support, a conveyor mounted for vertical movement to and from lower and upper positions for positioning a material-holder in and withdrawing it from the receptacle on said support, said conveyor having a vertical hollow shaft movable therewith, means for raising and lowering said hollow shaft for correspondingly moving the conveyor, and mechanism carried by said conveyor for rotating the material holder including a rotary shaft disposed in said hollow shaft and gears mounted on said conveyor externally thereof and operatively connected to said rotary shaft and to the material holder, and means including a clutch for operatively connecting said rotary shaft to a source of power, the driven part of said clutch being movable with said conveyor and automatically disengaging the driving part of said clutch when said conveyor is raised and automatically engaging the driving part of said clutch when said conveyor is lowered.

13. Automatic immersion apparatus, comprising a horizontal support for supporting a plurality of receptacles laterally of each other, a conveyor mounted both for vertical movement and for movement in a horizontal plane in relation to said support for positioning a material-holder in and removing it from each of a plurality of receptacles in succession, said conveyor having a hollow operating shaft movable therewith, and mechanism carried by said conveyor for rotating the material holder including a rotary shaft disposed in said hollow shaft and movable therewith for controlling the rotation of said rotary shaft, and gears mounted on said conveyor externally thereof and operatively connected to said rotary shaft and to the material holder.

14. Automatic immersion apparatus, comprising a horizontal support for supporting a plurality of receptacles laterally of each other, a conveyor mounted both for vertical movement and for movement in a horizontal plane in relation to said support for positioning a material-holder in and removing it from each of a plurality of receptacles in succession, said conveyor having a hollow operating shaft movable therewith, and mechanism carried by said conveyor for rotating the material holder including a rotary shaft disposed in said hollow shaft and gears mounted on said conveyor externally thereof and operatively connected to said rotary shaft, and means including a clutch for operatively connecting said rotary shaft to a source of power, the driven part of said clutch being carried by said rotary shaft and movable with said conveyor, and means on said driven part automatically disengaging cooperating means on the driving part of said clutch when said conveyor is raised and automatically engaging said cooperating means on the driving part of said clutch when said conveyor is lowered.

15. Automatic immersion apparatus, comprising a horizontal support for supporting a plurality of receptacles laterally of each other, in a circular row, a conveyor mounted for vertical movement and for rotary movement in relation to said support for positioning a material-holder in and removing it from each of a plurality of receptacles in succession, and mecahnisms for raising said conveyor, then turning it, and then lowering it during one operating cycle thereof, said mechanisms comprising a vertical and rotary shaft vertically and rotatably movable with the conveyor, a cam-follower arm engaging a part on said shaft to raise the latter, a cam for actuating said arm, a rotary shaft for actuating said cam, and an intermittent mechanical-movement mechanism operated by said last mentioned shaft and connected to said conveyor shaft to turn the latter in timed relation to the operation of said cam, said cam having a peripheral cam edge portion of predetermined contour to provide the conveyor with a predetermined dwell in its raised position.

16. Automatic immersion apparatus, comprising a horizontal support for supporting a plurality of receptacles laterally of each other, in a circular row, a conveyor mounted for vertical movement and for rotary movement in relation to said support for positioning a material-holder in and removing it from each of a plurality of receptacles in succession, and mecahnisms for raising said conveyor, then turning it, and then lowering it during one operating cycle thereof, said mechanisms comprising a vertical and rotary shaft vertically and rotatably movable with the conveyor, cam means operatively connected to said shaft to raise and lower said conveyor, a rotary shaft for actuating said cam means, and an intermittent mechanical-movement mechanism operated by said last mentioned shaft and connected to said conveyor shaft to turn the latter in timed relation to the operation of said cam means, said cam means having a dwell portion arranged so that said conveyor has a predetermined dwell in its raised position.

17. Automatic immersion apparatus, comprising a horizontal support for supporting a plurality of receptacles laterally of each other, in a circular row, a conveyor mounted for vertical movement and for rotary movement in relation to said support for positioning a material-holder in and removing it from each of a plurality of receptacles in succession, and mechanisms for raising said conveyor, then turning it, and then lowering it during one operating cycle thereof, said mechanisms comprising a vertical and rotary shaft vertically and rotatably movable with the conveyor, cam means operatively connected to said shaft to raise and lower said conveyor, a rotary shaft for actuating said cam means, and an intermittent mechanical-movement mechanism operated by said last mentioned shaft and connected to said conveyor shaft to turn the latter in timed relation to the operation of said cam means, said cam means having a dwell portion arranged so that said conveyor has a predetermined dwell in its raised position, and the intermittent mechanical-movement mechanism having a dwell part operative to delay the operation of said mechanical-movement mechanism so that said dwell of the conveyor begins and temporarily continues before said conveyor is turned during said operating cycle.

18. Automatic immersion apparatus, comprising a horizontal receptacle-support, a conveyor mounted for vertical movement to and from lower and upper positions for positioning a material-holder in and withdrawing it from the receptacle on said support, and means for turning the material-holder alternately in opposite directions about a vertical axis comprising a rotary driving shaft, a driven shaft, means for connecting the latter to the material holder, and a shaft-oscillating linkage connecting said driving shaft to said driven shaft.

19. Automatic immersion apparatus, comprising a horizontal receptacle-support, a conveyor mounted for vertical movement to and from lower and upper positions for positioning a material-holder in and withdrawing it from the receptacle on said support, said conveyor having a vertical hollow shaft movable therewith and arranged to be raised and lowered for correspondingly moving the conveyor, and mechanism carried by said conveyor for rotating the material holder including a rotary shaft disposed in said hollow shaft and gears mounted on said conveyor externally thereof and operatively connected to said rotary shaft, and oscillating mechanism operatively connected to said rotary shaft for rotating the latter alternately in opposite directions.

20. Automatic immersion apparatus, comprising a horizontal support having means for supporting a plurality of receptacles in equi-spaced relation laterally of each other in a circular row, a vertical conveyor shaft mounted axially of said support, a coupling supported by the upper part of said shaft, a rotary conveyor part connected to said shaft by said coupling, said coupling having companion members secured to said shaft and conveyor part, respectively, said coupling members being relatively adjustable circumferentially of the vertical axis of said shaft, means for releasably securing said coupling members in adjusted position, and means on said conveyor extending radially of said shaft axis toward said support for mounting a material holder on said conveyor in line with any one of a plurality of receptacles on said support.

21. Automatic immersion apparatus, comprising a horizontal support for supporting a plurality of receptacles laterally of each other, in a circular row, a conveyor mounted for vertical movement and for rotary movement in relation to said support for positioning a material-holder in and removing it from each of a plurality of receptacles in succession, and mechanisms for raising said conveyor, then turning it, and then lowering it during one operating cycle thereof, said mechanisms comprising a vertical and rotary shaft vertically and rotatably movable with the conveyor, a Geneva gear movement for turning said shaft, said movement having its driven gear surrounding said shaft, the latter being vertically movable axially of said driven gear, said driven gear having an opening therethrough parallel to and spaced outwardly from said shaft, means including a rod slidably fitting in said opening and operatively connected to said shaft to turn the latter when said driven gear is turned, and means for raising and lowering said shaft in timed relation to the shaft turning movements of said driven gear.

22. Automatic immersion apparatus, comprising a horizontal support for supporting a plurality of receptacles laterally of each other, in a circular row, a conveyor mounted for vertical movement and for rotary movement in relation to said support for positioning a material-holder in and removing it from each of a plurality of receptacles in succession, and mechanisms for raising said conveyor, then turning it, and then lowering it during one operating cycle thereof, said mechanisms comprising a vertical and rotary shaft vertically and rotatably movable with the conveyor, a Geneva gear movement for turning said shaft, said movement having its driven gear surrounding said shaft, the latter being vertically movable axially of said driven gear, said driven gear having an opening therethrough parallel to and spaced outwardly from said shaft, means including a rod slidably fitting in said opening and operatively connected to said shaft to turn the latter when said driven gear is turned, an adjustable coupling between said shaft and a part of said conveyor and having companion adjustable parts connected to said shaft and said part of the conveyor, respectively, said rod being connected to the part of the coupling which is connected to said shaft, means for raising and lowering said shaft in timed relation to the shaft turning movements of said driven gear, and means on said conveyor part extending radially of said shaft axis toward said support for mounting a material holder on said conveyor in line with any one of a plurality of receptacles on said support.

23. Automatic immersion apparatus, comprising a horizontal support having means for supporting a plurality of receptacles in equi-spaced relation laterally of each other in a circular row, a rotary conveyor part mounted axially of said receptacle support for vertical movement longitudinally of its axis of rotation, means for intermittently turning said conveyor part, means on said conveyor part extending radially of said axis toward said support for mounting a material-holder in alignment with each one of a plurality of receptacles on said support, between the successive turning movements of said conveyor part, said conveyor having relatively adjustable members for rotatably positioning said conveyor relative to said horizontal support for providing said alignment, a switch mounted in fixed position relative to said conveyor, means on said conveyor part releasably engageable with said switch for operating the latter when the conveyor is in a predetermined position of its rotation, and means for adjusting the position of said switch to conform to the adjustment of said adjustable members of said conveyor whereby said switch will be operated in said predetermined position of the conveyor.

24. Automatic immersion apparatus, comprising a horizontal support having means for supporting a plurality of receptacles in equi-spaced relation laterally of each other in a circular row, a rotary conveyor part mounted axially of said receptacle support for vertical movement longitudinally of its axis of rotation, means for intermittently turning said conveyor part, means on said conveyor part extending radially of said axis toward said support for mounting a material-holder in alignment with each one of a plurality of receptacles on said support, between the successive turning movements of said conveyor part, mechanisms for raising said conveyor, then turning it, and then lowering it during one operating cycle thereof, and means for rotating the material holder comprising a gear-transmission case carried by said conveyor, and having a plurality of spaced power outlets and a plurality of driven gears accessible at said outlets, respectively, for the operative connection of one end of a detachable shaft to a gear at a selected one of said outlets, the other end of said shaft being in operative engagement with said material-holder.

25. Automatic immersion apparatus, comprising upper and lower horizontal supports each provided with means to support a plurality of receptacles laterally of each other, in a circular row, a conveyor mounted for vertical movement in relation to said supports and for horizontal turning movement about an axis extending in the direction of said vertical movement, supporting means on said conveyor to carry a material-holder into and out of the receptacles on said upper support, supporting means on said conveyor to carry a material-holder into and out of the receptacles on said lower support, mechanism for operating said conveyor to raise, turn and lower the latter in sequence, and mechanism carried by said conveyor for turning the material-holding means when said conveyor is lowered, said last-mentioned mechanism comprising a gear-transmission case having a plurality of spaced power outlets and a plurality of driven gears accessible at said outlets, respectively, for the operative connection of one end of a detachable shaft to a gear at a selected one of said outlets, the other end of said shaft being in operative engagement with said material-holder.

26. In automatic immersion apparatus in which a material holder is vertically movable into and out of each of a plurality of receptacles in succession, a vertically movable conveyor for effecting said movement of said material holder, said conveyor being provided with an inclined member and a bracket carried by said inclined member, said braket having a part thereof secured to said inclined member of the conveyor and an additional bracket part angularly connected to said first mentioned part thereof and positioned horizontally for supporting a carrier for said material holder to position the latter in a vertical position depending therefrom.

27. In automatic immersion apparatus in which a material holder is vertically movable into and out of each of a plurality of receptacles in succession, vertically spaced supports for supporting a plurality of receptacles thereon, respectively, a vertically movable conveyor provided with an upwardly inclined member and a downwardly inclined member, a bracket carried by each of said members, said brackets each having a part thereof attachable to one of said members and an additional bracket part angularly connected to said first mentioned part thereof and positioned horizontally for supporting a carrier for said material holder to position the latter in a vertical position depending therefrom when said brackets are attached to said inclined members.

28. In automatic immersion apparatus in which a material holder is vertically movable into and out of each of a plurality of receptacles in succession, a vertically movable conveyor for effecting said movement of said material holder, said conveyor being provided with an inclined member and a bracket carried by said inclined member, said bracket having a part thereof secured to said inclined member of the conveyor and an additional bracket part angularly connected to said first mentioned part thereof and positioned horizontally for supporting a carrier for said material holder to position the latter in a vertical position depending therefrom, said angularly connected bracket part having opposite ends thereof provided with slots for mounting a pair of cover-carrying members for two adjacent receptacles.

29. In automatic immersion apparatus in which a material holder is vertically movable into and out of each of a plurality of receptacles in succession, a vertically movable conveyor for effecting said movement of said material holder, said conveyor being provided with an inclined member and a bracket carried by said inclined member, said bracket having a part thereof secured to said inclined member of the conveyor and an additional bracket part angularly connected to said first mentioned part thereof and positioned horizontally for supporting a carrier for said material holder to position the latter in a vertical position depending therefrom, said angularly connected bracket part having opposite ends thereof provided with slots, cover-carrying members mounted in said slots, and a holder-carrier supported by one of said cover-carrying members.

30. In automatic immersion apparatus in which a material holder is vertically movable into and out of each of a plurality of receptacles in succession, a vertically movable conveyor for effecting said movement of said material holder, said conveyor being provided with an inclined member and a bracket carried by said inclined member, said bracket having a part thereof secured to said inclined member of the conveyor and an additional bracket part angularly connected to said first mentioned part thereof and positioned horizontally for supporting a carrier for said material holder to position the latter in a vertical position depending therefrom, said angularly connected bracket part having opposite ends thereof provided with slots, cover carrying members mounted in said slots, a holder-carrier supported by one of said cover carrying members, said angularly connected bracket part having an additional slot in at least one of said opposite ends, and means releasably engageable in said additional slot for releasably fastening said one of said cover carrying members to said bracket.

31. Automatic immersion apparatus, comprising upper and lower horizontal supports each provided with means to support a plurality of receptacles laterally of each other in a circular row, said upper support having a central opening, a conveyor having an operating shaft disposed axially of said opening and mounted for vertical and turning movements in relation to said supports, supporting means on said conveyor extending above said upper support to carry a material-holder into and out of the receptacles on said upper support, supporting means on said conveyor extending through said central opening of the upper support to carry a material-holder into and out of the receptacles on said lower support, and mechanism operatively connected to said shaft for imparting said vertical and turning movements thereto, said upper support and said first mentioned supporting means being releasably secured to and removable from said lower support and conveyor, respectively.

32. Automatic immersion apparatus, comprising a frame provided with upper and lower horizontal supports each provided with means to support a plurality of receptacles laterally of each other in a circular row, said upper support having a central opening, a conveyor having an operating shaft disposed axially of said opening and mounted for vertical and turning movements in relation to said supports, supporting means on said conveyor extending above said upper support to carry a material-holder into and out of the receptacles on said upper support, supporting means on said conveyor extending through said central opening of the upper support to carry a material-holder into and out of the receptacles on said lower support, said frame including a plurality of circumferentially spaced vertical parts on which said upper support is mounted, said vertical parts and said upper support being removable from said frame and said first mentioned supporting means being removable from said conveyor.

33. Automatic immersion apparatus, comprising a horizontal receptacle support, a conveyor mounted for vertical movement to and from lower and upper positions for positioning a material-holder in and withdrawing it from the receptacles on said support, said conveyor having a horizontal rotary part and a plurality of circumferentially spaced parts carried by said horizontal part and disposed in inclined relation to the axis of rotation thereof, and releasable coupling means for releasably securing said circumferentially spaced parts in said inclined relation to said horizontal part.

34. Automatic immersion apparatus, comprising a horizontal support for supporting a plurality of receptacles laterally of each other, a conveyor mounted for vertical movement and for movement in a horizontal plane in relation to said support for positioning a material-holder in and removing it from each of a plurality of receptacles in succession, and means for imparting said movements to said conveyor including cam means for raising and lowering said conveyor, said cam means having a dwell portion operable to hold the conveyor temporarily in raised position, with the material-holder positioned over one receptacle, before the conveyor is moved in said horizontal plane to position the material-holder in and to remove it from the next successive receptacle.

35. Automatic immersion apparatus, comprising a horizontal support for supporting a plurality of receptacles laterally of each other, a conveyor mounted for vertical movement and for movement in a horizontal plane in relation to said support for positioning a material-holder in and removing it from each of a plurality of receptacles in succession, and means for imparting said movements to said conveyor including cam means for raising and lowering said conveyor, said cam means having a dwell portion operable to hold the conveyor temporarily in raised position, with the material-holder positioned over one receptacle, before the conveyor is moved in said horizontal plane to position the material-holder in and to remove it from the next successive receptacle, said cam means comprising a cam mounted for rotation about a horizontal axis and having a peripheral cam edge which includes said dwell portion, and a cam follower engaging said edge and operatively connected to said conveyor.

36. In automatic immersion apparatus comprising a frame including a horizontal support including a peripherally extending part for carrying a plurality of receptacles in position in a circular row, a conveyor mounted for vertical movement at the center of said row of receptacles and rotatable in a horizontal plane for positioning a material-holder in and removing it from each of a plurality of said receptacles, and mechanism for raising and lowering said conveyor and for turning the latter after it is raised and before it is lowered for transferring said holder from one of said receptacles to another; a housing for said mechanism extending above said support and disposed inwardly of said peripherally extending part of the latter, said support having provision for mounting thereon a second peripherally extending part, elevated above said first mentioned peripherally extending part, for carrying a plurality of receptacles in a circular row above said first mentioned receptacles, and said conveyor having provision for carrying a material holder to move the latter into and out of the receptacles which are mounted on said last mentioned peripherally extending part of the support.

37. In automatic immersion apparatus comprising a frame including a horizontal support including a peripherally extending part for carrying a plurality of receptacles in position in a circular row, a conveyor mounted for vertical movement at the center of said row of receptacles and rotatable in a horizontal plane for positioning a material-holder in and removing it from each of a plurality of said receptacles, and mechanism for raising and lowering said conveyor and for turning the latter after it is raised and before it is lowered for transferring said holder from one of said receptacles to another; a housing for said mechanism extending above said support and disposed inwardly of said peripherally extending part of the latter, said mechanism including a rotary shaft extending upwardly beyond the top of said housing and said peripherally extending part of said support being below the top of said housing, said conveyor having a part for carrying said material-holder disposed for movement in a circular path around a vertically extending peripheral wall portion of said housing.

38. In automatic immersion apparatus comprising a frame including a horizontal support including a peripherally extending part for carrying a plurality of receptacles in position in a circular row, a conveyor mounted for vertical movement at the center of said row of receptacles and rotatable in a horizontal plane for positioning a material-holder in and removing it from each of a plurality of said receptacles, and mechanism for raising and lowering said conveyor and for turning the latter after it is raised and before it is lowered for transferring said holder from one of said receptacles to another; a housing for said mechanism extending above said support and disposed inwardly of said peripherally extending part of the latter, said mechanism including a rotary shaft extending upwardly beyond the top of said housing and said peripherally extending part of said support being below the top of said housing, said conveyor having a part for carrying said material-holder disposed for movement in a circular path around a vertically extending peripheral wall portion of said housing, said support having provision for mounting thereon a second peripherally extending part, elevated above said first mentioned peripherally extending part, for carrying a plurality of receptacles in a circular row above said first mentioned receptacles, and said conveyor having provision for carrying a material holder to move the latter into and out of the receptacles which are mounted on said last mentioned peripherally extending part of the support.

39. Automatic immersion apparatus comprising a horizontal receptacle-support, a conveyor mounted for vertical movement to and from lower and upper positions for positioning a material-holder in and withdrawing it from the receptacle on said support, and means for turning the material-holder alternately in opposite directions about a vertical axis comprising a rotary driving shaft, a driven shaft, means for connecting the latter to the material holder, and a shaft-oscillating mechanism connecting said driving shaft to said driven shaft.

NELSON G. KLING.

REFERENCES CITED

The following references are of record in the file of this patent:

UNITED STATES PATENTS

| Number | Name | Date |
| --- | --- | --- |
| 2,341,197 | Weiskopf | Feb. 8, 1944 |
| 2,341,198 | Weiskopf | Feb. 8, 1944 |